United States Patent [19]
Pigott et al.

[11] Patent Number: 5,343,814
[45] Date of Patent: Sep. 6, 1994

[54] PLASTIC PALLET ASSEMBLY

[76] Inventors: Maurice J. Pigott, 591 Cherry St., Winnetka, Ill. 60093; Brandon L. Pigott, 1017 Elmwood Ave.; Peter S. Pigott, 803 Elmwood Ave., both of Wilmette, Ill. 60091; Schuyler F. Pigott, 1122 N. Patton St., Arlington Heights, Ill. 60004

[21] Appl. No.: 961,396

[22] Filed: Oct. 15, 1992

Related U.S. Application Data

[63] Continuation-in-part of Ser. No. 644,928, Jan. 23, 1991, Pat. No. 5,197,395, which is a continuation-in-part of Ser. No. 230,025, Aug. 9, 1988, Pat. No. 4,843,976.

[51] Int. Cl.$^5$ .................................................. B65D 19/00
[52] U.S. Cl. .................................. 108/56.1; 108/901; 108/51.1
[58] Field of Search ................... 108/51.1, 51.3, 901, 108/902, 56.1, 56.3

[56] References Cited

U.S. PATENT DOCUMENTS

| | | |
|---|---|---|
| Re. 32,344 | 2/1987 | Wind . |
| D. 233,373 | 10/1974 | Rehrig . |
| 2,991,965 | 7/1961 | Drieborg . |
| 3,307,504 | 3/1967 | Cloyd et al. . |
| 3,606,844 | 9/1971 | Lubker, II et al. . |
| 3,664,271 | 5/1972 | Wolder et al. . |
| 3,680,495 | 8/1972 | Pike . |
| 3,691,965 | 9/1972 | Cloyd . |
| 3,868,915 | 3/1975 | Hafner ................................ 100/51.1 |
| 4,002,126 | 1/1977 | Bell et al. . |
| 4,013,020 | 3/1977 | Schoeller et al. ............... 108/55.3 X |
| 4,013,021 | 3/1977 | Steinlein et al. . |
| 4,051,787 | 10/1977 | Nishitani et al. . |
| 4,146,205 | 3/1979 | Skinner ............................ 108/901 X |
| 4,183,491 | 1/1980 | Sanders et al. . |
| 4,230,049 | 10/1980 | Horne . |
| 4,287,836 | 9/1981 | Aoki . |
| 4,580,680 | 4/1986 | Wind . |
| 4,782,763 | 11/1988 | Salloum . |
| 4,799,433 | 1/1989 | Luft . |
| 4,869,456 | 9/1989 | Jacobs . |
| 4,879,956 | 11/1989 | Shuert ................................ 108/53.3 |
| 4,928,827 | 5/1990 | Hara . |
| 4,951,821 | 8/1990 | Kempkes . |
| 4,972,782 | 11/1990 | Shepherd et al. . |
| 4,998,619 | 3/1991 | Sowa et al. . |
| 5,094,175 | 3/1992 | Christie ........................... 108/901 X |
| 5,097,951 | 3/1992 | Pigott et al. . |
| 5,160,029 | 11/1992 | Pigott et al. . |
| 5,197,396 | 3/1993 | Breeton et al. .................... 108/56.3 |

FOREIGN PATENT DOCUMENTS

| | | |
|---|---|---|
| 23328/70 | 6/1972 | Australia . |
| 42086/72 | 11/1973 | Australia . |
| 2613083 | 3/1976 | Fed. Rep. of Germany . |
| 3806097 | 9/1989 | Fed. Rep. of Germany . |
| 2160677 | 6/1973 | France . |
| 2259023 | 8/1975 | France . |
| 2274512 | 1/1976 | France . |
| 701869 | 5/1979 | U.S.S.R. . |
| 166486 | 7/1921 | United Kingdom . |
| 1310898 | 3/1973 | United Kingdom . |

Primary Examiner—Jose V. Chen
Attorney, Agent, or Firm—Wallenstein, Wagner & Hattis, Ltd.

[57] ABSTRACT

A plastic pallet (10) is disclosed that comprises a generally rectangular pallet base (20), a generally rectangular pallet deck (100) and plurality of connectors (11) interconnecting the base and the deck. The base (20) includes a pair of side members (31), a pair of end members (32) and a pair of cross members (33,34). The deck (110,210) is generally rectangular and has a planar outer surface (122,222) and an inner surface (121,221) with a reinforcement structure projecting outwardly therefrom.

14 Claims, 9 Drawing Sheets

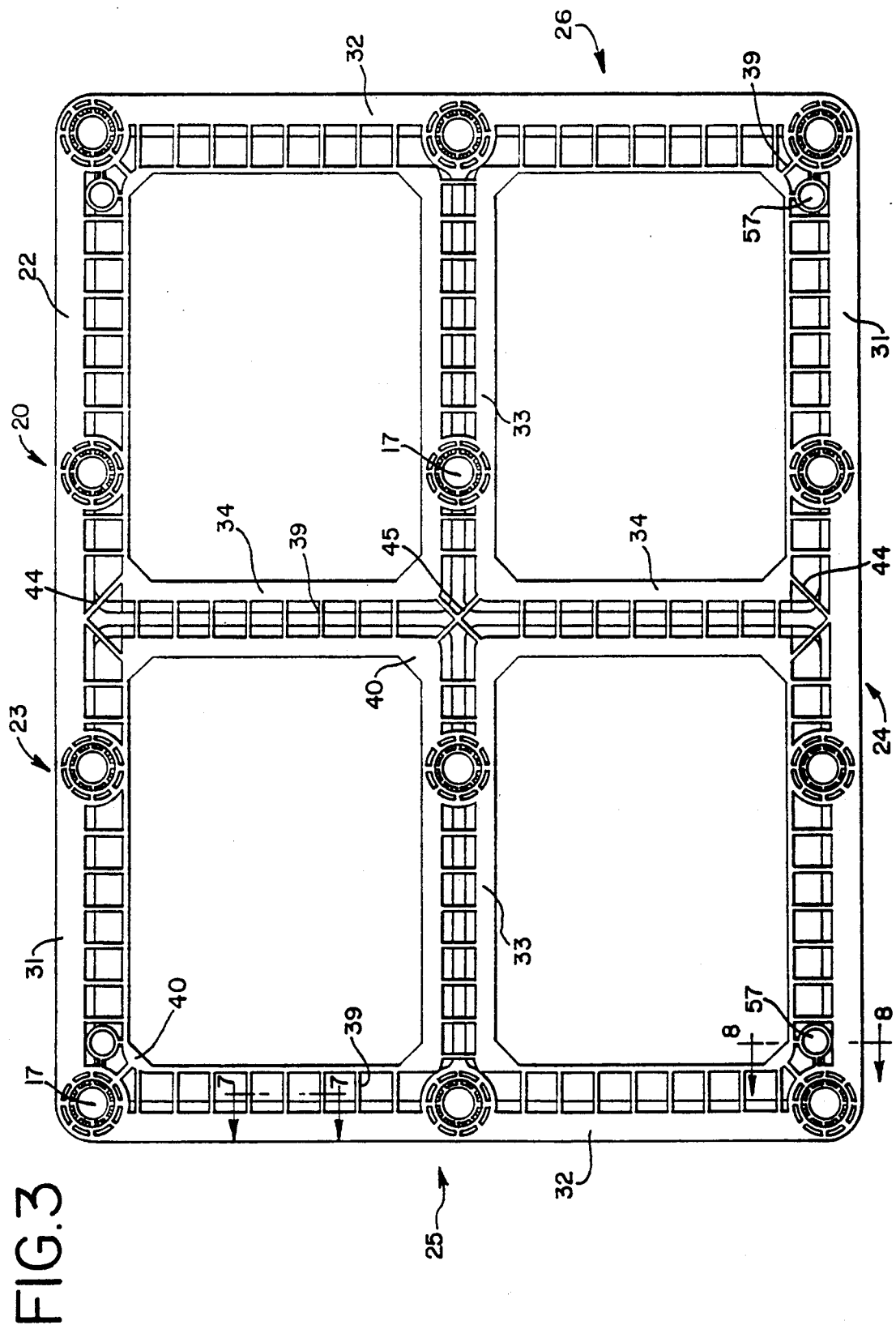

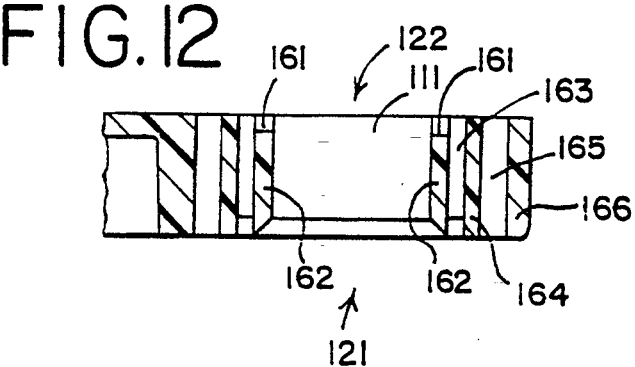
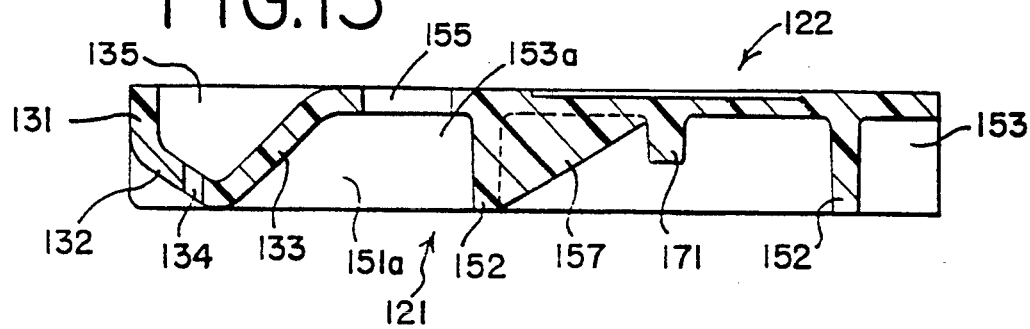
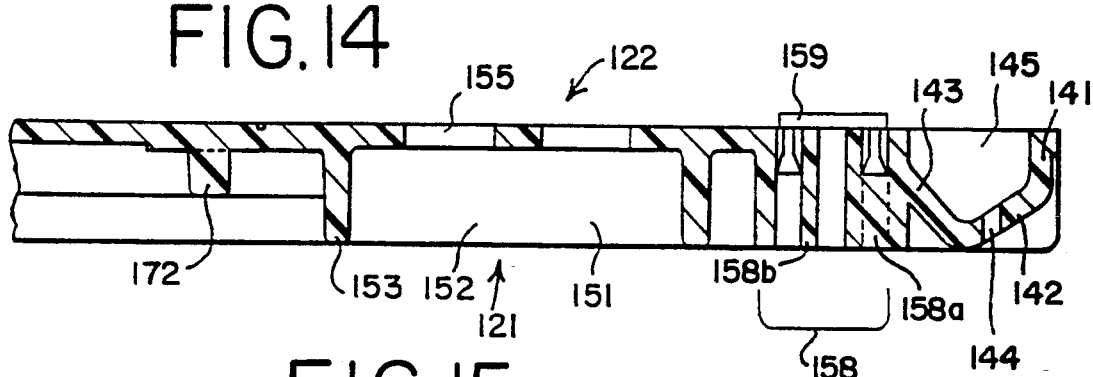
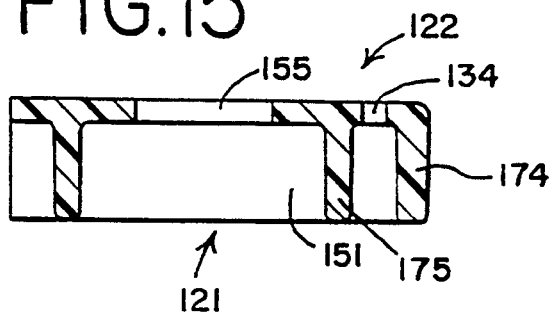
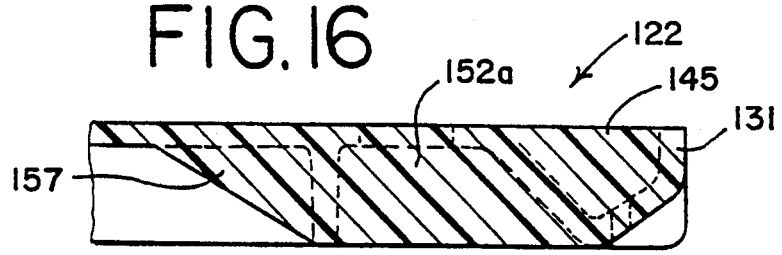

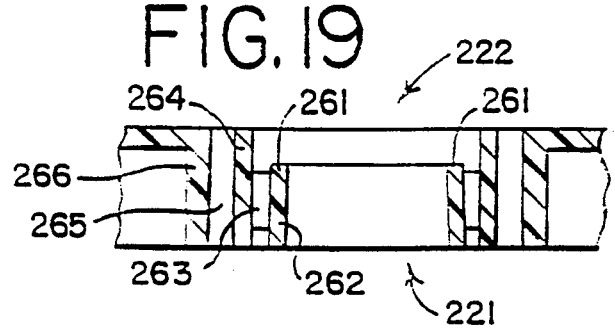
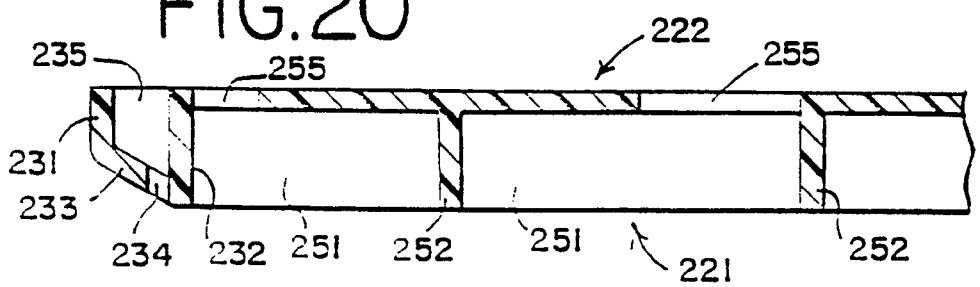
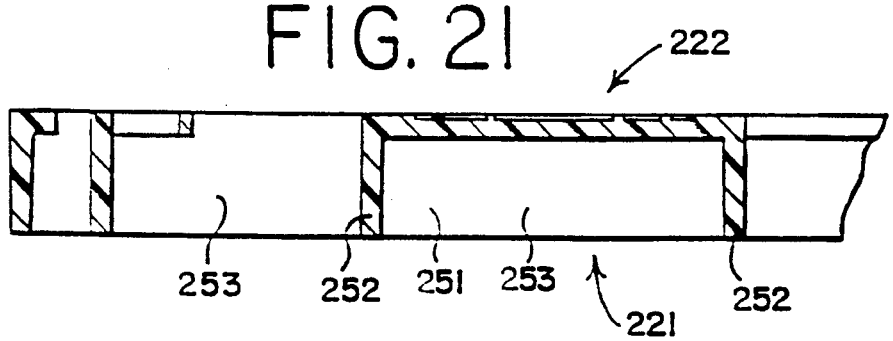
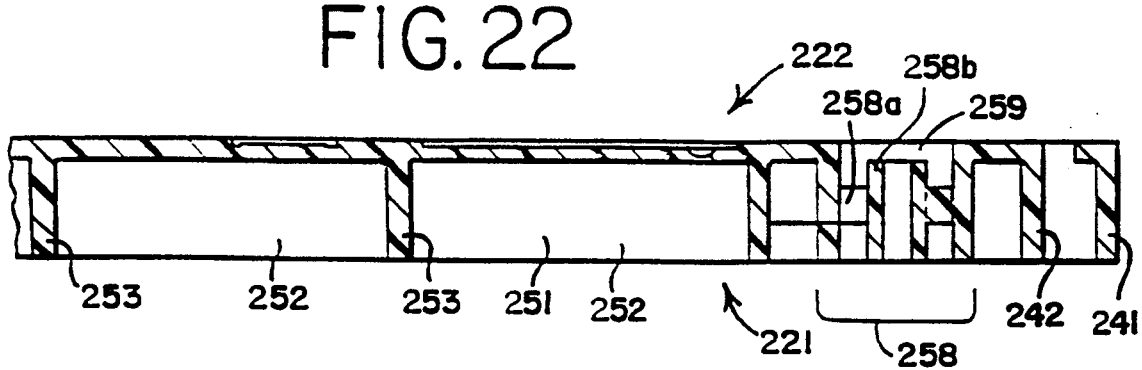
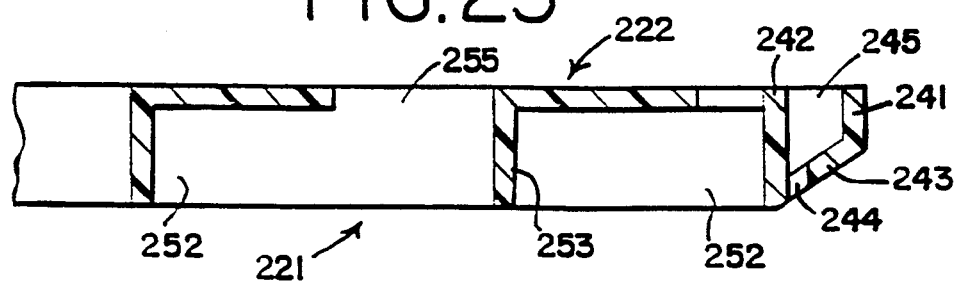

PLASTIC PALLET ASSEMBLY

Reference to Related Application

This is a continuation-in-part application of U.S. Ser. No. 644,928 filed Jan. 23, 1991, for a PLASTIC PALLET WITH DECK ASSEMBLY, now U.S. Pat. No. 5,197,395 which is a continuation-in-part application of U.S. Ser. No. 230,025, filed Aug. 9, 1988, for a PLASTIC PALLET, now U.S. Pat. No. 4,843,976, issued Jul. 4, 1989.

Technical Field

The present invention relates to pallets for storing and transporting goods, and more particularly to a pallet that comprises a unitary base and a unitary deck that are connected by a plurality of connectors. The pallet can be easily assembled for supporting goods and easily disassembled for transportation and storage.

BACKGROUND PRIOR ART

It is customary to transport goods and to store goods on pallets. Palletized goods are maintained in a position above the flooring which can be very advantageous in areas where there is flooding or where the condition of the flooring is either rough or of concern. Standard pallets are particularly useful in materials handling because forklift equipment can maneuver the pallets by inserting their forklift tines into channels provided by the pallet. Typically, pallets are constructed of wood. In the past, wooden pallets have provided advantages of economy, simplicity and durability, principally because of the lack of other suitable materials. However, wooden pallets are extremely heavy and require costly hand labor in their fabrication.

In the past decades, disposable pallets have been proposed and, with the growth of the plastics industry, a wide variety of plastics have been investigated to determine their suitability for use in producing pallets. Plastic pallets can easily be molded and are stronger and lighter in weight than wooden pallets. They can also now be made with recyclable materials. Furthermore, plastic pallets are more durable than wooden pallets.

A recent plastic pallet that is light in weight, durable, capable of supporting heavy loads and is easy to manufacture and have a minimum number of parts that are preferably interchangeable are disclosed in U.S. Ser. No. 644,928 filed Jan. 23, 1991 for a PLASTIC PALLET WITH DECK ASSEMBLY and in U.S. Pat. No. 4,843,976 for a PLASTIC PALLET. The pallets and connectors disclosed in this patent and application have proven to be highly successful. In an effort to improve thereon, to reduce costs and weight of the pallets and to increase strength yet not decrease durability, the pallet of the present invention was developed. The present pallet is useful in material handling and designed for use with forklift equipment.

SUMMARY OF THE INVENTION

The present invention comprises a pallet base for use in combination with a second pallet base or, preferably, a pallet deck and a plurality of connectors. The pallet base is interconnected to the second pallet base or deck by the connectors.

According to a first aspect of the present invention, the pallet base has two surfaces, namely an inner surface facing the interior of the assembled pallet and an outer surface facing outwardly from the assembled pallet. The base includes a pair of substantially parallel side members, with a plurality of openings therein for receiving the connectors. The side members are hooked-shaped in cross-section. The concave surface of the side members is the outer surface. It further includes a pair of substantially parallel end members that are substantially perpendicular to the side members and connected to the side members, with a plurality of openings therein for receiving the connectors. The end members are also hooked-shaped in cross-section. Again, the concave surface of the end members is the outer surface. A first cross member, with a plurality of openings therein for receiving connectors, is disposed approximately halfway between the two end members and is connected to the end members. The first cross member is U-shaped in cross section with the concave surface thereof being the outer surface. A second cross member, without any openings therein for receiving the connectors, is disposed approximately halfway between the two side members and is connected to the side members. The second cross member is also U-shaped in cross section with the concave surface being the outer surface.

The inner surface of the base has inner reinforcement elements projecting therefrom that are a plurality of spaced apart transverse inner ribs. The opposed outer surface has outer reinforcement elements projecting therefrom that are a plurality of spaced apart transverse outer ribs.

According to another aspect of the present invention, the pallet base further including a generally X-shaped outer rib wherein the first cross member intersects the second cross member and the side members include a generally V-shaped outer rib wherein the second cross member intersects thereto. The openings are formed by sleeves attached to the end, side and first cross members by spokes with each sleeve having an outer recessed abutment for supporting a portion of the connector. The pallet base also has a circular support wall projecting outwardly from the outer surface adjacent each of the corner connector openings.

According to further aspects of the present invention, two pallet bases are disclosed for interconnecting with the pallet base by a plurality of connectors. Each of the bases are generally rectangular and have a first side, an opposed second side, a first end and an opposed second end. The bases further have a substantially planar outer surface with perimeter reinforcement means. The perimeter reinforcement means including a perimeter end wall and at least one intermediate inclined end wall with the one inclined end wall having a drain therein.

In the first embodiment, the end perimeter reinforcement means includes a substantially vertical perimeter end wall and a first inclined end wall integral with a second inclined end wall. The first inclined end wall includes a drain. The side perimeter reinforcement means includes a substantially vertical perimeter side wall and a first inclined side wall integral with a second inclined side wall. The first inclined side wall includes a drain. Spaced and parallel intermediate side walls are integral with and bridge the perimeter end wall and the planar section of the outer surface, and spaced and parallel intermediate end walls are integral with and bridge the perimeter side wall and the planar section of the outer surface. Both the side and the end perimeter reinforcement means are hooked-shape in cross-section.

In the second embodiment, the end perimeter reinforcement means includes a substantially vertical first perimeter end wall and a substantially vertical second perimeter end wall connected by an integral inclined end wall. The inclined end wall includes a drain. Similarly, the side perimeter reinforcement means includes a substantially vertical first perimeter side wall and a substantially vertical second perimeter side wall connected by an integral inclined end wall. The inclined side wall includes a drain. Spaced and parallel intermediate side walls flush with the outer surface are integral with and bridge the first perimeter end wall and the second perimeter end wall, and spaced and parallel intermediate end walls flush with the outer surface are integral with and bridge the first perimeter side wall and the second perimeter side wall.

Both decks have an inner surface with a reinforcement structure projecting outwardly therefrom. The reinforcement structure includes a plurality of generally rectangular cells formed by a plurality of parallel end walls and a plurality of side walls. Most of the cells include apertures for drainage. Moreover, the two decks have a first row of openings adjacent the first side of the deck, a second row of openings adjacent the second side of the deck, and an intermediate row of openings parallel to and disposed between said first row and said second row of openings, all for receiving the connectors. There is also a centrally located side wall generally bisecting the cells along the third row of openings.

The openings in the decks and the base are formed by sleeves attached by spokes, each said sleeve having an outer recessed abutment for supporting a portion of the connector. Adjacent the openings at the corners of the deck are circular side support walls.

In the first embodiment of the deck, the cells diagonally adjacent the openings at the corners of the deck include diagonal intermediate cross walls, diagonal intermediate cross walls and adjacent gussets. In addition, the cells diagonally adjacent the cells including diagonal intermediate cross members have four inclined cross walls. Also, select cells between the openings in the third row of openings include inclined cross walls. Finally, the end wall adjacent the perimeter end wall has gussets attached thereto.

Other advantages and aspects of the present invention will become apparent upon reading the following description of the drawings and detailed description of the invention.

BRIEF DESCRIPTION OF DRAWINGS

FIG. 3 is a bottom plan view of the base of FIG. 2;

FIG. 12 is a cross-sectional view along line 12—12 in FIG. 11;

FIG. 13 is a cross-sectional view along line 13—13 in FIG. 11;

FIG. 14 is a cross-sectional view along line 14—14 in FIG. 11;

FIG. 15 is a cross-sectional view along line 15—15 in FIG. 11;

FIG. 16 is a cross-sectional view along line 16—16 in FIG. 11;

FIG. 19 is a cross-sectional view along line 19—19 in FIG. 18;

FIG. 20 is a cross-sectional view along line 20—20 in FIG. 18;

FIG. 21 is a cross-sectional view along line 21—21 in FIG. 18;

FIG. 22 is a cross-sectional view along line 22—22 in FIG. 18; and,

FIG. 23 is a cross-sectional view along line 23—23 in FIG. 18.

DETAILED DESCRIPTION

Figure 1:
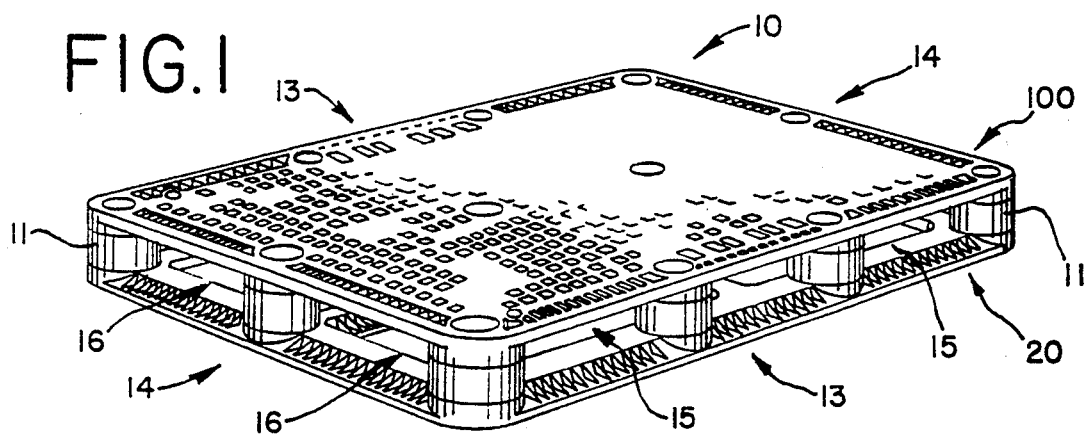
FIG. 1 is a top perspective view of the plastic pallet made in accordance with the teachings of the present invention.

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to embodiments illustrated.

A. The Pallet Assembly

FIG. 1 of the drawings shows a plastic pallet, generally designated by reference numeral 10, having three primary components. The components are a base 20, a deck 100 and a plurality of connectors 11. The connectors 11 that interconnect the deck and base are specially designed so that the pallet can be assembled without the need for any specially designed tools. The plastic pallet is designed such that the connectors can be snap fitted onto the decks.

The details of the connectors are disclosed and claimed in the invention by the same inventors of the present invention, U.S. Pat. No. 4,843,976 for a PLASTIC PALLET, which is incorporated herein by reference.

In the preferred embodiment, the pallet incorporates twelve (12) connectors 11. Both the deck and the base have openings which define surrounding abutments that are recessed below the exposed surface and the connectors have flexible tangs that have barbs which engage the abutments. The pallet 10 has opposed sides 13 and opposed ends 14. In the illustrated embodiment, the connectors are shown positioned at the four corners of the base and deck members and between each of the corners along the ends 14 of the pallet as well as two rows between each of the corners along the sides 13 of the pallet. The connectors 11 are positioned so that forklift tines can be inserted into side channels 15 and end channels 16 for lifting and moving the assembled pallet and the palletized goods.

B. The Base

Figure 2:
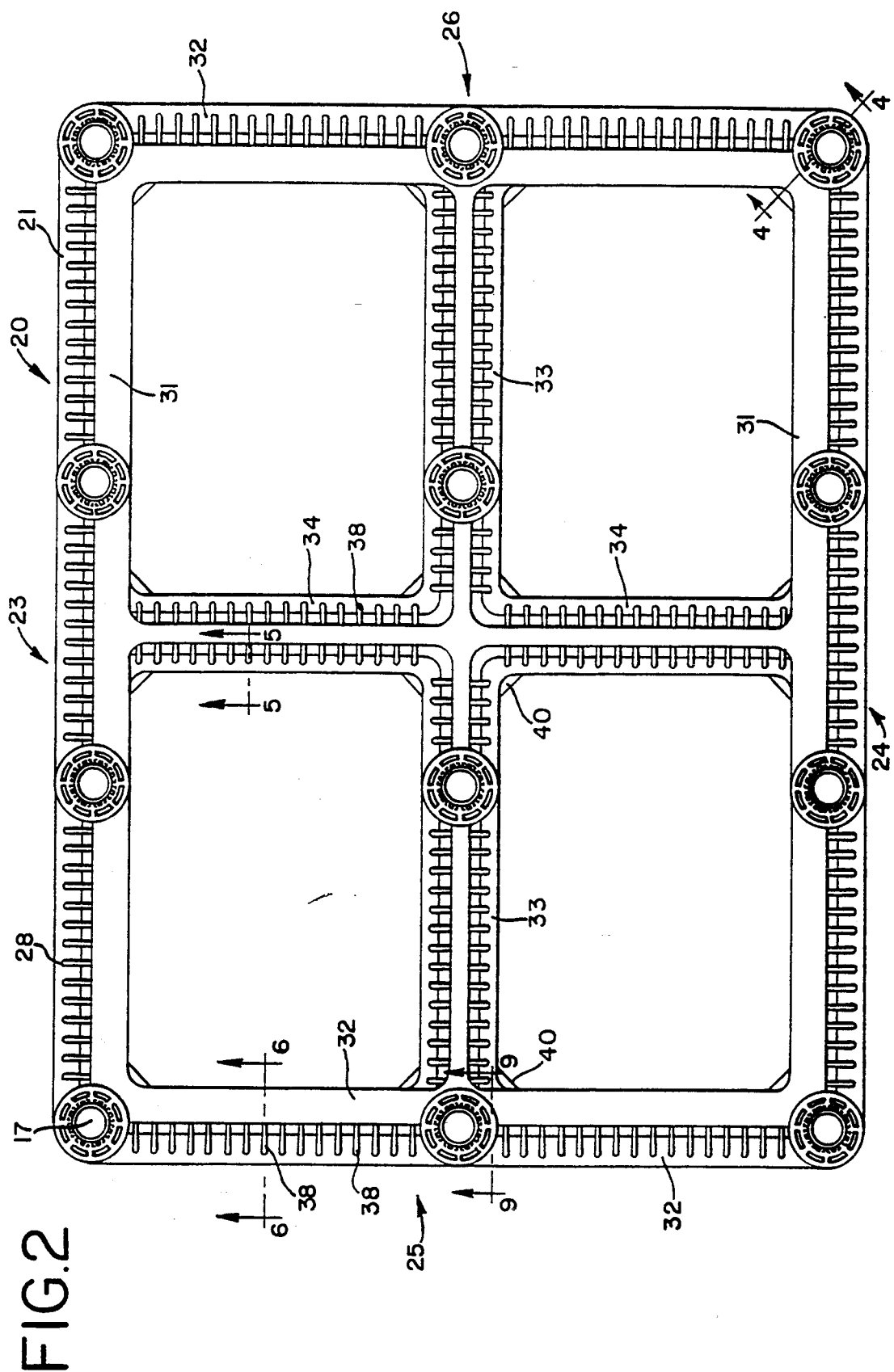
FIG. 2 is a top plan view of a base of the pallet of the present invention.

The base 20 of the present invention, shown in detail in FIGS. 2-9, is used below the deck 100 and in use generally rests on the ground or floor. Because goods are not normally placed on the base 20, it is not a flat, continuous surface, rather it is much like a frame structure. The base has two surfaces, namely an inner surface 21 and an outer surface 22. The outer surface 22 is the surface that faces out from the pallet; specifically the surface that faces down and contacts the ground or floor when the pallet is constructed. The inner surface 21 is the surface facing the inside of the pallet, i.e., the side that the connectors are attached to. The inner surface 21 is shown in FIG. 2 and the outer surface 22 is shown in FIG. 3.

The base 20 is generally rectangular in shape. It has a first side 23, an opposed second side 24, a first end 25 and an opposed second end 26. The base structure itself includes a pair of substantially parallel side members 31 with a plurality of openings 17 therein for receiving the connectors 11. A pair of substantially parallel end members 32 that are substantially perpendicular to the side members and connected to the side members are provided. Like the side members 31, the end members have a plurality of openings 17 therein for receiving the connectors 11.

A first cross member 33 with openings 17 for receiving the connectors 11 is disposed between the end members 32 and is connected to the end members. A second cross member 33 with openings 17 for receiving the connectors 11 is disposed between the side members 31 and is connected to the side members.

Figure 6:
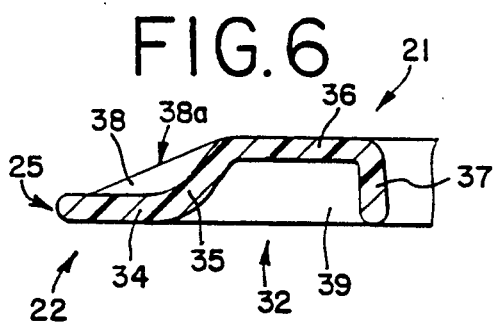
FIG. 6 is a cross-sectional view along line 6—6 in FIG. 2.
Figure 7:
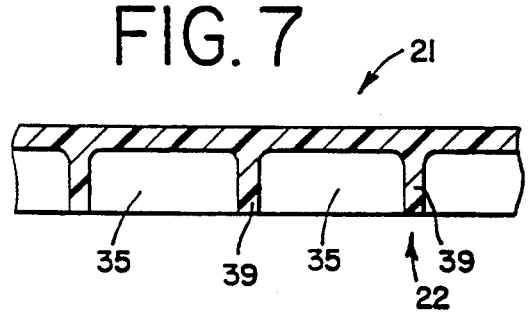
FIG. 7 is a cross-sectional view along line 7—7 in FIG. 3.

Turning to FIG. 6, there is shown cross section of an end member 32, which is similar to a side member 31. The end members 32, like the side members 31, are hooked-shaped in cross-section. In particular, at the first end 25, the end member has a horizontal portion 34 which is integral with an upwardly and inwardly projecting portion 35, which, in turn, is connected to a second horizontal portion 36. This second horizontal portion 36 is positioned above the first horizontal portion 34 adjacent the first end 25. The second horizontal portion 36 terminates with a vertical portion 37. Accordingly, the concave surface formed by the upwardly and inwardly projecting portion 35, second horizontal portion 36 and vertical portion 37 of the end members 32 (and also side member 31) is the outer surface 22.

The inner surface 21 is contoured with inner reinforcement elements projecting outwardly therefrom. These inner reinforcement elements are a plurality of spaced, parallel transverse inner ribs 38 integral with the inner surfaces of the first horizontal portion 34, upwardly and inwardly projecting portion 35 and the second horizontal portion 36. The inner surface 38a of the transverse inner ribs 38 and act as guides or ramps for the forklift tines. Thus, if a tine hits the inclined surface, rather than pushing the pallet, it will slide along the incline to its proper position. Similarly, the opposed outer surface 22 is contoured with outer reinforcement elements projecting therefrom. These outer reinforcement elements are a plurality of transverse outer ribs 39 that span the outer concave surface of the side or end members.

Figure 5:
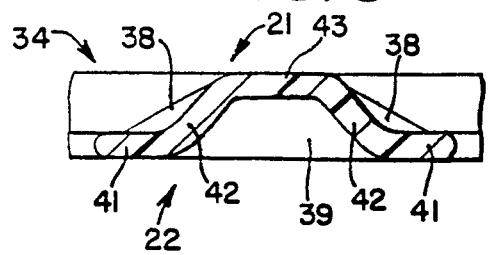
FIG. 5 is a cross-sectional view along line 5—5 in FIG. 2.

Turning to FIG. 5, there is shown a cross-section of a second cross member 34. The second cross member 34, like the first cross member 33, is U-shaped in cross section. In particular, at the sides it has horizontal portions 41 which are integral with upwardly and inwardly projecting portions 42 which, in turn, are connected to a second horizontal portion 43. This second horizontal portion 43 is positioned above the first horizontal portions 41 adjacent the sides. Thus, the concave surface formed by the upwardly and inwardly projecting portions 42 and second horizontal portion 43 is the outer surface 22.

The inner surface 21 of the cross members 33,34 are contoured with inner reinforcement elements projecting outwardly therefrom that are spaced, parallel transverse inner ribs 38 integral with the inner surfaces of the first horizontal portion 41, upwardly and inwardly projecting portions 42 and second horizontal portion 43. Similarly, the opposed outer surface 22 is contoured with outer reinforcement elements projecting therefrom that are transverse outer ribs 39 that span the outer concave surface of the cross members.

Shown in FIGS. 2 and 3, the side, end and cross members include webs 40 at the points of their joining one another for additional strength.

Shown further in FIG. 3, the outer surface 22, additional support ribs are provided. Specifically, the side members 31 include a generally V-shaped outer rib 44 at the junction of where the second cross member intersects the two side members. In addition, the outer surface 22 includes a generally X-shaped outer rib 45 at the junction where the first cross member 33 intersects the second cross member 34.

Openings 17 for the connectors 11 are formed by sleeves and spokes built into the end, side and first cross member. In practice it has been found that twelve (12) openings are sufficient. There are, in fact three rows of openings, the first row of openings being in the first side member 23, the second row of openings being in the second side member 24, and the intermediate row, or third row, of openings being parallel to and disposed between the first row and the second row of openings in the first cross member 33. Each row has an opening at the ends (in the corners for the first and second rows and in the center of the end members 32,33 for the third row) and two intermediate openings.

Figure 4:
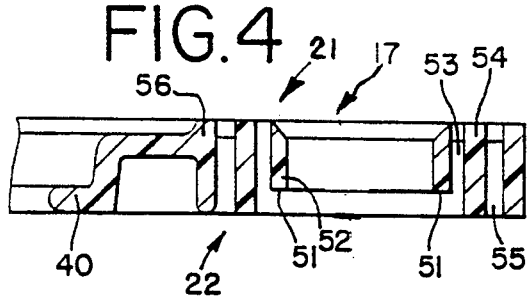
FIG. 4 is a cross-sectional view along line 4—4 in FIG. 2.

As clearly shown in FIGS. 2, 3 and 4, the base 20 has openings 17 that are adapted to receive tangs of the connectors. The openings 17 are surrounded by outer recessed abutments 51 that are recessed below the plain of the adjacent outer surface 66 of the base. The outer recessed abutments 51 are defined by an inner sleeves 52 which is connected by spokes 53 to an outer sleeve 54. The outer sleeve 54 is connected by a second spoke 55 to a third sleeve 56 formed into the base. The connectors can thus be snapped into the base, on the inner surface, by applying axial force to the connectors so that the barbs of the connectors will snap into position onto the outer recessed abutment 51. With this construction, the barbs will not extend out beyond the plain of the outer surface. After all of the connectors are assembled on one base, the deck is positioned as shown in FIG. 1 and a force is applied to the outside surface of the deck to complete the assembly of the plastic pallet.

Figure 8:
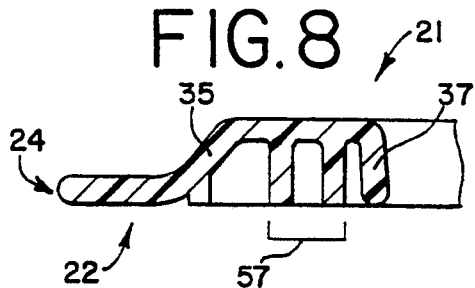
FIG. 8 is a cross-sectional view along line 8—8 in FIG. 3.
Figure 9:
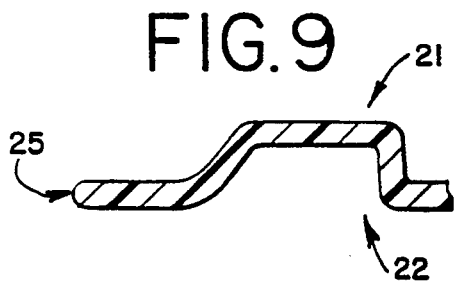
FIG. 9 is a cross-sectional view along line 9—9 in FIG. 2.

Shown in FIGS. 3 and 8, the pallet base has a circular support wall 57 projecting outwardly from the outer surface 22 adjacent each of the corner connector openings.

C. The First Deck

In the preferred embodiment, shown in FIG. 1, the base 20 is connected, via connectors, to a deck 100. It is the deck that the goods are placed on. Two deck embodiments are disclosed, the first embodiment in FIGS. 10–16 and the second embodiment in FIGS. 17–23.

Figure 10:
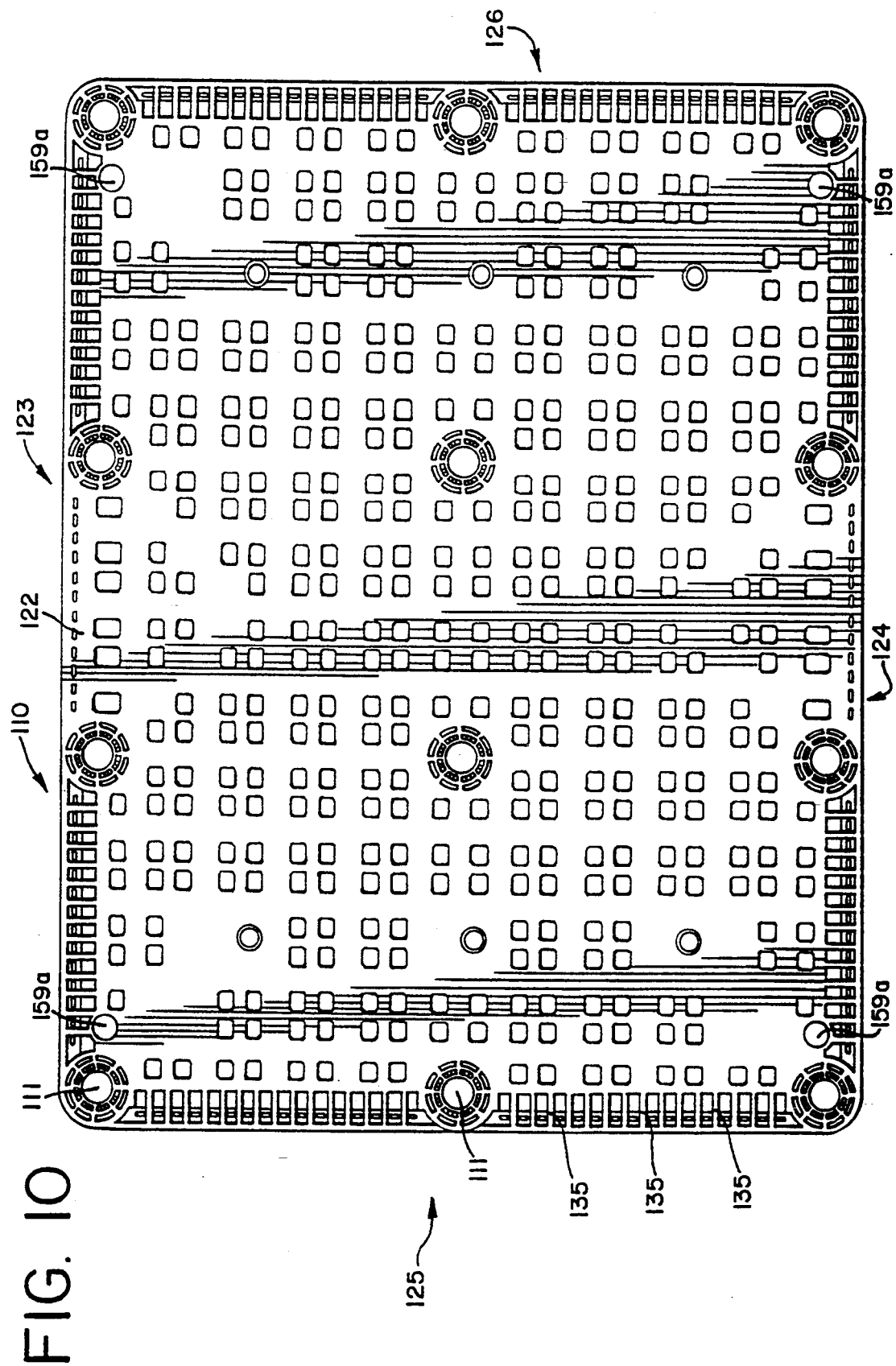
FIG. 10 is a top plan view of a first embodiment of a deck of the pallet of the present invention.

FIG. 10 of the drawings shows a first deck 110 of the present invention. The deck 110 has two surfaces, namely an inner surface 121 (FIG. 11) and an outer surface 122 (FIG. 10). The outer surface 122 is the surface that faces out from the pallet; specifically it is the surface that faces up and contacts the goods being palletized. The inner surface 121 is the surface facing the inside of the pallet, i.e., the side that the connectors are attached to.

The deck 110 is generally rectangular in shape. It has a first side 123, an opposed second side 124, a first end 125 and an opposed second end 126. The outer surface 122 is substantially planar and includes perimeter reinforcement means. The end perimeter reinforcement means (FIG. 13) includes a substantially vertical perimeter end wall 131 and a first inclined end wall 132 integral with a second inclined end wall 133. The first inclined end wall 132 includes a drain 134. Spaced and parallel intermediate side walls 135 are integral with and bridge the perimeter end wall 131 and the planar section of the outer surface. Similarly, the side perimeter reinforcement means (FIG. 14) includes a substantially vertical perimeter side wall 141 and a first inclined side wall 142 integral with a second inclined side wall 143. The first inclined side wall 142 includes a drain 144. Spaced and parallel intermediate end walls 145 are integral with and bridge the perimeter side wall 141 and the planar section of the outer surface. Both the side and the end perimeter reinforcement means are hooked-shape in cross-section. The concave surface of the reinforcement means is the outer surface 122. The first inclined end walls 132 and first inclined side walls 142 act as guides or ramps for the forklift tines. Thus, if a tine hits the inclined wall, rather than pushing the pallet, it will slide along the incline to its proper position.

Figure 11:
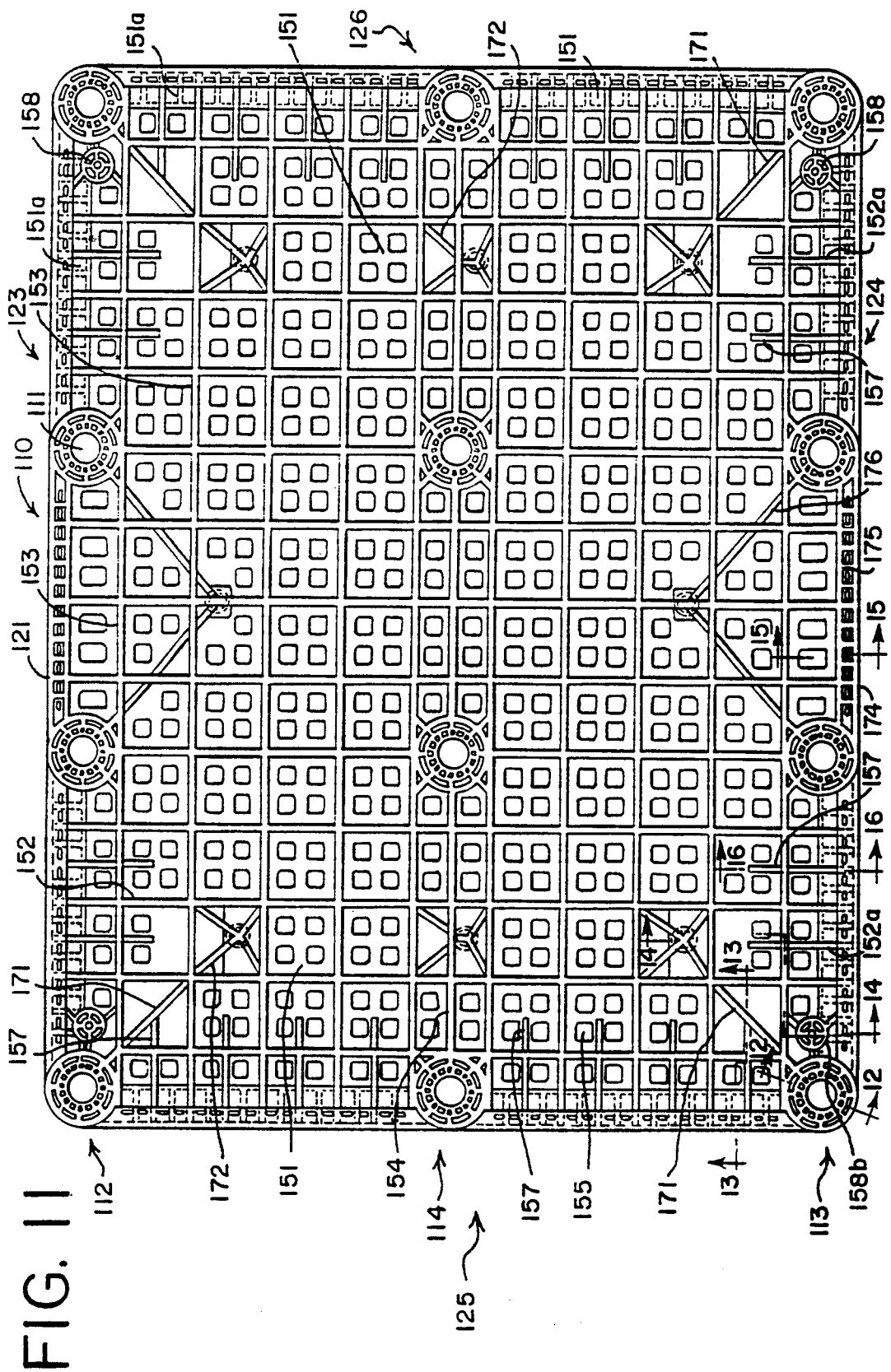
FIG. 11 is a bottom plan view of the deck of FIG. 10.

The inner surface 121 of the deck has a reinforcement structure that projects outwardly therefrom. This reinforcement structure includes a plurality of cells 151 formed by a plurality of parallel end walls 152 and a plurality of side walls 153. The cells 151 are substantially rectangular and, apart from the perimeter cells 151a, the cells 151 are approximately the same size. The matrix formed by these end walls 152 and side walls 153 is shown in FIG. 11. Most of the perimeter cells 151a include a second end wall 152a between the end walls 152 and a second side wall 153 (FIG. 13) a between the side walls 152. Gussets 157 are further provided adjacent the second end walls 152a and second side walls 153a in the cells 151 adjacent the perimeter cells with the second walls. The gussets 157 are perpendicular the end walls 152.

As discussed previously, there are preferably twelve (12) openings in both the base and the deck for receiving the connectors. The openings are designated with the reference number 111. In the deck 110, there is a first row of openings 112 adjacent the first side 123, a second row of openings 113 adjacent the second side 124 of the deck and an intermediate row of openings 114 parallel to and disposed between the first row 112 and the second row 113 of openings.

Like the base, openings 111 in the base 110 for the connectors 11 are formed by sleeves and spokes built into the deck. Shown in FIG. 12, the deck has openings 111 that are adapted .to receive tangs of the connectors. The openings 111 are surrounded by outer recessed abutments 161 that are recessed below the plain of the adjacent outer surface 122 of the deck. The outer recessed abutments 161 are defined by an inner sleeves 162 which is connected by spokes 163 to an outer sleeve 164. The outer sleeve 164 is connected by a second spoke 165 to a third sleeve 166 formed into the deck. The connectors can thus be snapped into the deck, on the inner surface, by applying axial force to the connectors so that the barbs of the connectors will snap into position onto the outer recessed abutment 161. With this construction, the barbs will not extend out beyond the plain of the outer surface. After all of the connectors are assembled on one deck, the base can be positioned as shown in FIG. 1 and a force is applied to the outside surface of the deck to complete the assembly ok the plastic pallet.

As further seen in FIG. 11, for added strength there is a centrally located central side wall 154 generally bisecting the cells 151 along the third row of openings 114. Moreover, it should be noted that most of the cells 151 include apertures 155 for drainage and to reduce the amount of material used. To avoid the problem of having goods falling through the deck, the apertures are not large.

Shown in FIGS. 11 and 14, the pallet deck has a circular support wall 158 projecting outwardly from the inner surface 121 adjacent each of the corner connector openings 111. Spokes 158a project inwardly from the circular support wall 158 and terminate at a circular sleeve 158b. On the opposite surface, namely the outer surface 122, of the circular support wall 158, spokes 158a and sleeve 158, there is a circular recess for receiving rubber pads 159a.

Turning again to FIG. 11, the cells 151 diagonally adjacent said openings 111 at the corners of the deck include a diagonal intermediate cross wall 171. These cells with the diagonal intermediate cross wall 171 further include an adjacent gusset 157 but do not include an aperture therein. The cells 151 diagonally adjacent these cells with a diagonal intermediate cross member 171 include four inclined cross walls 172 projecting inwardly from the corners of the cell. As also seen in the figure, select cells 151 between the openings 111 in the third, center row of openings 114 also include inclined cross walls 173 projecting inwardly from the corners of the cell.

FIGS. 11 and 15, show the perimeter reinforcement structure and cells disposed between the two perimeter center openings 111. Because a forklift tine is not intended to enter the pallet adjacent this section, there is neither a first or second inclined side walls nor a intermediate end wall. Rather, there is a substantially vertical second perimeter side wall 174 and a closely spaced parallel third perimeter side wall 175. A drain 134 is disposed between them.

Additional central diagonal walls 176 (FIG. 11) also project towards the center of the base from the two perimeter center openings 111 for added strength.

D. The Second Deck

Figure 17:
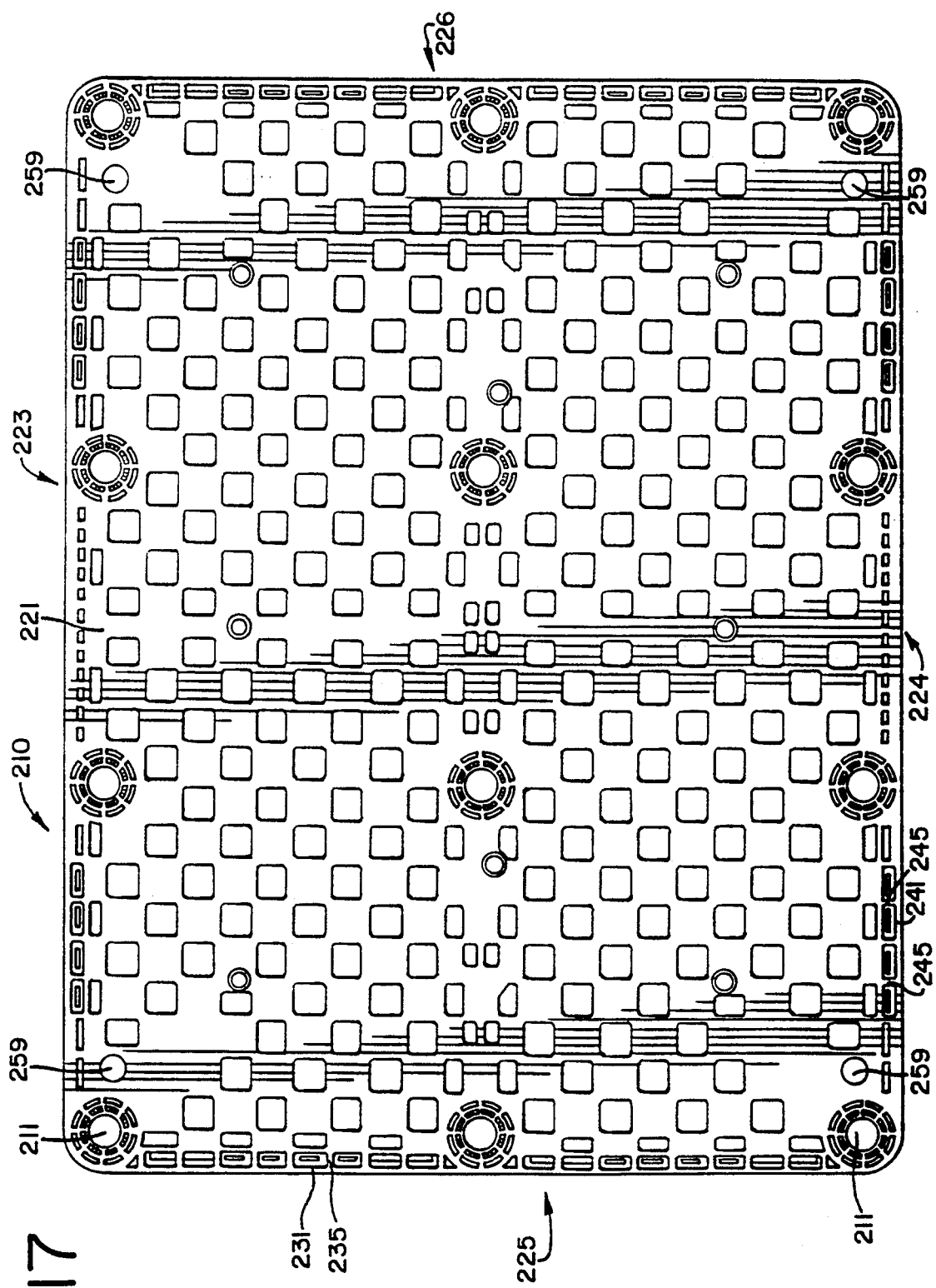
FIG. 17 is a top plan view of a second embodiment of a deck of the pallet of the present invention.

A second deck embodiment is shown in FIGS. 17–23. FIG. 17 of the drawings shows the second deck 210 of the present invention. The deck 210 has two surfaces, namely an inner surface 221 (FIG. 18) and an outer surface 222 (FIG. 17). The outer surface 222 is the surface that faces out from the pallet, facing up and contacting the goods being palletized. The inner surface 221 is the surface facing the inside of the pallet and the base, i.e., the side that the connectors are attached to.

The deck 210 is generally rectangular in shape. It has a first side 223, an opposed second side 224, a first end 225 and an opposed second end 226. The outer surface 222 is substantially planar and also includes perimeter reinforcement means. The end perimeter reinforcement means (FIG. 20) includes a substantially vertical first perimeter end wall 231 and a substantially vertical second perimeter end wall 232 connected by an integral inclined end wall 233. The inclined end wall 233 includes a drain 234. Spaced and parallel intermediate side walls 235 flush with the outer surface 222 are integral with and bridge the first perimeter end wall 231 and the second perimeter end wall 232. Similarly, the side perimeter reinforcement means (FIG. 23) includes a substantially vertical first perimeter side wall 241 and a substantially vertical second perimeter side wall 242 connected by an integral inclined end wall 243. The inclined side wall 242 includes a drain 244. Spaced and parallel intermediate end walls 245 flush with the outer surface 222 are integral with and bridge the first perimeter side wall 241 and the second perimeter side wall 242. The concave surface of the reinforcement means, or the cell formed by it, is the outer surface 222. The inclined end walls 233 and inclined side walls 243 act as guides or ramps for the forklift tines.

The inner surface 121 of the deck has a reinforcement structure that projects outwardly therefrom. This reinforcement structure includes a plurality of cells 251 formed by a plurality of parallel end walls 252 and a plurality of side walls 253. The cells 251 are substantially rectangular and, apart from the perimeter cells 251a, the cells 251 are approximately the same size. The matrix formed by these end walls 252 and side walls 253 is shown in FIG. 18.

There are twelve (12) openings 211 for receiving the connectors. In the deck 210, like the first embodiment 110, there is a first row of openings 212 adjacent the first side 223, a second row of openings 213 adjacent the second side 224 of the deck and an intermediate row of openings 214 parallel to and disposed between the first row 212 and the second row 213 of openings.

Openings 111 in the base 210 for the connectors 11 are formed by sleeves and spokes built into the deck. Shown in FIG. 19, the deck has openings 211 that are adapted to receive tangs of the connectors. The openings 211 are surrounded by outer recessed abutments 261 that are recessed below the plain of the adjacent outer surface 222 of the deck. The outer recessed abutments 261 are defined by an inner sleeves 262 which is connected by spokes 263 to an outer sleeve 264. The outer sleeve 264 is connected by a second spoke 265 to a third sleeve 266 formed into the deck. The connectors can thus be snapped into the deck, on the inner surface, by applying axial force to the connectors so that the barbs of the connectors will snap into position onto the outer recessed abutment 261. With this construction, the barbs will not extend out beyond the plain of the outer surface. After all of the connectors are assembled on one deck, the base can be positioned as shown in FIG. 1 and a force is applied to the outside surface of the deck to complete the assembly of the plastic pallet.

Figure 18:
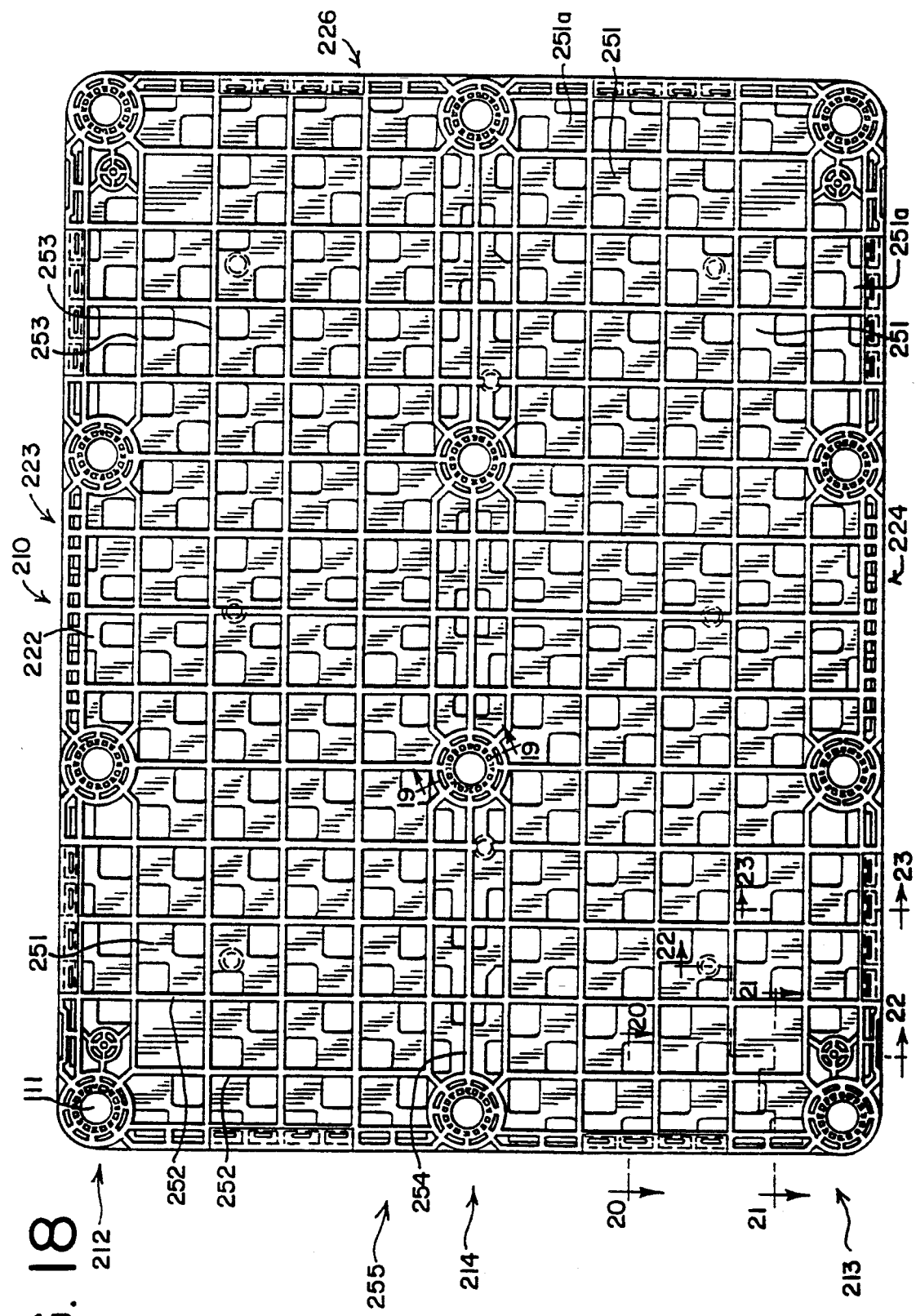
FIG. 18 is a bottom plan view of the deck of FIG. 17.

As further seen in FIG. 18, for added strength there is a centrally located central side wall 254 generally bisecting the cells 251 along the third row of openings 214. Moreover, it should be noted that most of said cells 251 include apertures 255 for drainage and to reduce the amount of material being used. To avoid the problem of having goods falling through the deck, the apertures are not large.

Shown in FIGS. 18 and 22, the pallet deck has a circular support wall 258 projecting outwardly from the inner surface 221 adjacent each of the corner connector openings 211. Spokes 258a project inwardly from the circular support wall 258 and terminate at a circular sleeve 258b. On the opposite surface, namely the outer surface 222, of the circular support wall 258, spokes 258a and sleeve 258, there is a circular recess for receiving rubber pads 259 (FIG. 17).

The perimeter reinforcement structure and cells disposed between the two perimeter center openings 211 are substantially vertical because a forklift tine is not intended to enter the pallet at this section.

The two pallet components, namely the base and the deck, are preferably injection molded from recycled material, such as polypropylene or similar thermoplastic material. Additionally, a pigment may be added to provide color combinations to suit the customer's needs.

Of course, the size and shape and the number of connectors can be varied without departing from the spirit of the invention. Also, while identical decks have been shown and described, the decks could have different shapes or configurations.

It will be appreciated that the simplicity of the plastic pallet reduces the inventory substantially since only two components are necessary. Also, since the base or deck only requires recessed shoulders formed in wells, the molds for producing the large decks are greatly simplified which reduces the production costs.

The intricate design of the connectors has several distinct advantages. The design is such that all external forces are transmitted to the center of the core, which will withstand the greatest force without destruction. Furthermore, the connectors are configured so that they are formed as one piece in a single stage mold to reduce the cost. Since the connectors and the decks are preferably injection molded from recycled plastic, the costs are further reduced.

Another significant advantage of the plastic pallet is that the connectors can easily be separated should one the connectors become damaged. This can be accomplished by the owner without return of the pallet assembly to the manufacturer.

While the specific embodiments have been illustrated and described, numerous modifications come to mind without significantly departing from the spirit of the invention and the scope of protection is only limited by the scope of the accompanying claims.

We claim:

1. A pallet base for use in combination with a second pallet base or a pallet deck and a plurality of connectors, the pallet base having an outer perimeter, an inner surface and an outer surface and being interconnected to the second pallet base or deck by the connectors, comprising:

a pair of substantially parallel side members and a pair of substantially parallel end members that are substantially perpendicular to said side members, both said side and said end members having a plurality of openings therein for receiving the connectors, and being hooked-shaped in cross-section, and including a substantially horizontal first portion forming the outer perimeter, a ramp portion, a substantially horizontal second portion and a vertical portion, the outer surface of said ramp portion, said horizontal second portion and said vertical portion being concave;

a first cross member disposed between and connected to said end members and a second cross member disposed between and connected to said side members, both said first and second cross members having a plurality of openings therein for receiving the connectors, and being U-shaped in cross section, and including a substantially horizontal second portion having two sides with a ramp portion and a substantially horizontal first portion integral with each of said two sides of said horizontal second portion, the outer surface of said ramp portions and said horizontal second portion being concave;

a second cross member disposed between said side members and connected to said side members, said inner surface having a plurality of spaced apart transverse inner ribs, projecting therefrom; and, said opposed outer surface having a plurality of spaced apart transverse outer ribs projecting therefrom.

2. The pallet base as defined in claim 1 wherein said openings are formed by sleeves attached to said end, said side and said first cross member by spokes, each said sleeve having an outer recessed abutment for supporting a portion of the connector.

3. The pallet base as defined in claim 1, further including a generally X-shaped outer rib wherein said first cross member intersects said second cross member and wherein said side members include a generally V-shaped outer rib wherein said second cross member intersects thereto and said openings are formed by sleeves attached to said end, said side and said first cross member by spokes, each said sleeve having an outer recessed abutment for supporting a portion of the connector.

4. A generally rectangular pallet deck having an outer perimeter a first side, an opposed second side, a first end and an opposed second end for use in combination with a second pallet deck or a pallet base and a plurality of connectors, the pallet deck being interconnected to the second pallet deck or base by the connectors, comprising:

a substantially planar outer surface with perimeter reinforcement means, said perimeter reinforcement means including a substantially vertical perimeter wall forming the outer perimeter and two adjacent inclined perimeter walls joined at an apex, the outer surface of said inclined perimeter walls being concave, one said inclined perimeter wall having a drain therein;

an inner surface with a reinforcement structure projecting outwardly therefrom, said reinforcement structure including a plurality of cells formed by a plurality of parallel end walls and a plurality of side walls;

a first row of openings adjacent the first side of the deck for receiving the connectors;

a second row of openings adjacent the second side of the deck for receiving the connectors; and, an intermediate row of openings parallel to and disposed between said first row and said second row of openings.

5. The pallet deck as defined in claim 4, wherein each such cell being substantially rectangular and approximately the same size.

6. The pallet deck as defined in claim 5, wherein there is a centrally located side wall generally bisecting said cells along said intermediate row of openings.

7. The pallet deck as defined in claim 6, wherein most of said cells include an apertures for drainage.

8. The pallet deck as defined in claim 7, wherein said openings are formed by sleeves attached by spokes, each said sleeve having an outer recessed abutment for supporting a portion of the connector.

9. The pallet deck as defined in claim 5, wherein said openings adjacent the first and the second end of the deck have circular side support walls adjacent thereto.

10. The pallet deck as defined in claim 5, wherein said cells diagonally adjacent said openings at the corners of the deck include diagonal intermediate cross walls.

11. The pallet deck as defined in claim 10, wherein said cells including diagonal intermediate cross walls further include adjacent gussets.

12. The pallet deck as defined in claim 11, wherein said cells diagonally adjacent said cells including diagonal intermediate cross members include four inclined cross walls.

13. The pallet deck as defined in claim 12, wherein select cells between said openings in said intermediate row of openings include inclined cross walls.

14. The pallet deck as defined in claim 13, wherein end wall adjacent said perimeter end wall has gussets attached thereto.

* * * * *